March 8, 1932. J. J. BIEGER 1,848,152
HIGH VOLTAGE PROTECTIVE DEVICE
Filed Nov. 21, 1928 2 Sheets-Sheet 1

Inventor:
John J. Bieger
By Owen W. Kennedy
attorney

March 8, 1932. J. J. BIEGER 1,848,152
HIGH VOLTAGE PROTECTIVE DEVICE
Filed Nov. 21, 1928  2 Sheets-Sheet 2

Inventor:
John J. Bieger
By Owen W. Kennedy
Attorney

Patented Mar. 8, 1932

1,848,152

UNITED STATES PATENT OFFICE

JOHN J. BIEGER, OF NEW YORK, N. Y., ASSIGNOR TO SIGNAL ENGINEERING AND MANUFACTURING COMPANY, OF NEW YORK, N. Y., A CORPORATION OF MASSACHUSETTS

HIGH VOLTAGE PROTECTIVE DEVICE

Application filed November 21, 1928. Serial No. 320,999.

My invention relates to a high voltage protective device, and has for its object to provide means for automatically cutting off the primary winding of a high tension transformer from its source of supply, whenever the secondary winding operating at high tension develops an open circuit, from any cause whatsoever.

As will hereinafter more fully appear, my improved protective device is so constructed that it may be readily installed in the operating circuit of a high tension transformer, so that there will be no danger of leakage between the windings of the transformer, or to ground. In addition, the device is so constructed that following its automatic functioning to deenergize the primary winding in the event of an open circuit in the secondary circuit, the device can be readily restored to its normal operating condition by replacing a part which is adapted to be melted by the discharge of high tension current, somewhat in the manner of an ordinary fuse. The above and other advantageous features of my invention will hereinafter more fully appear reference being had to the accompanying drawings, in which—

Like reference characters refer to like parts in the different figures.

Figure 1:
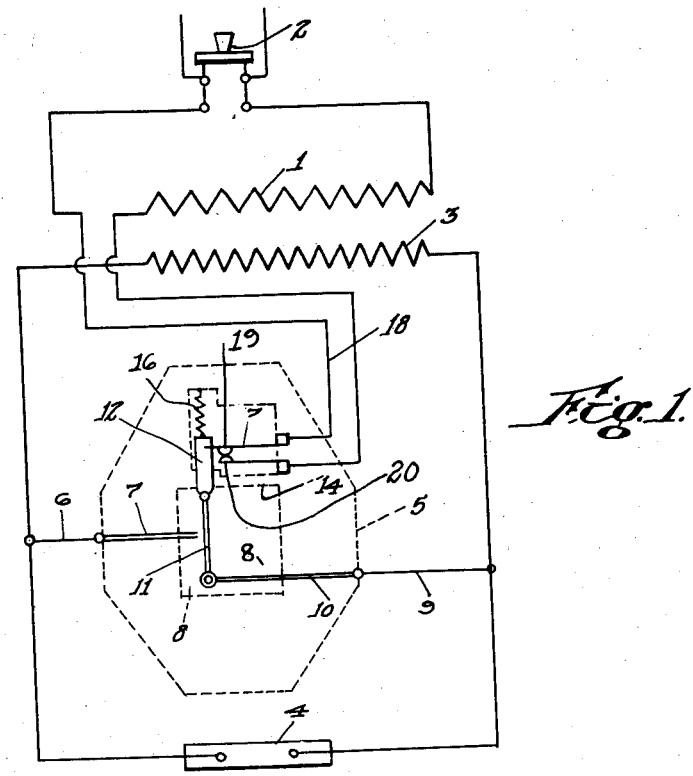
Fig. 1 is a diagrammatic view illustrating the circuit connections employed in connection with my device.

Referring to Fig. 1, the primary or low voltage winding of a transformer is indicated at 1, the terminals of which are connected to a suitable alternating current source not shown, by a switch 2. The secondary, or high voltage, winding 3 is adapted to supply current at high voltage to a suitable load 4, and under all normal conditions of operation, the circuit of the high voltage winding 3 is continuous through the load 4, the energization of the transformer being preferably controlled through the knife switch 2 located in the primary circuit between the winding 1 and the source.

While the exact nature of the load 4 in the circuit of the secondary winding 3 is more or less immaterial in the functioning of my device, it will be assumed for the purpose of illustrating the utility of my device that the load 4 is a high voltage lamp in the form of a discharge tube, such as is employed in connection with advertising signs and other forms of illumination. When utilizing such a load, it is obvious that should the circuit of the high tension secondary winding 3 be broken at any place from accidental causes, or through failure of the lamp itself, the lamp will no longer be illuminated, and it will be impossible to tell by casual inspection whether or not the high tension secondary winding is energized. Obviously, this is a dangerous condition and my protective device provides means whereby upon the occurrence of a break in the high tension secondary circuit, the circuit of the primary winding 1 will be automatically broken, thereby deenergizing the transformer and rendering all parts of the secondary circuit dead.

Figures 2, 3:
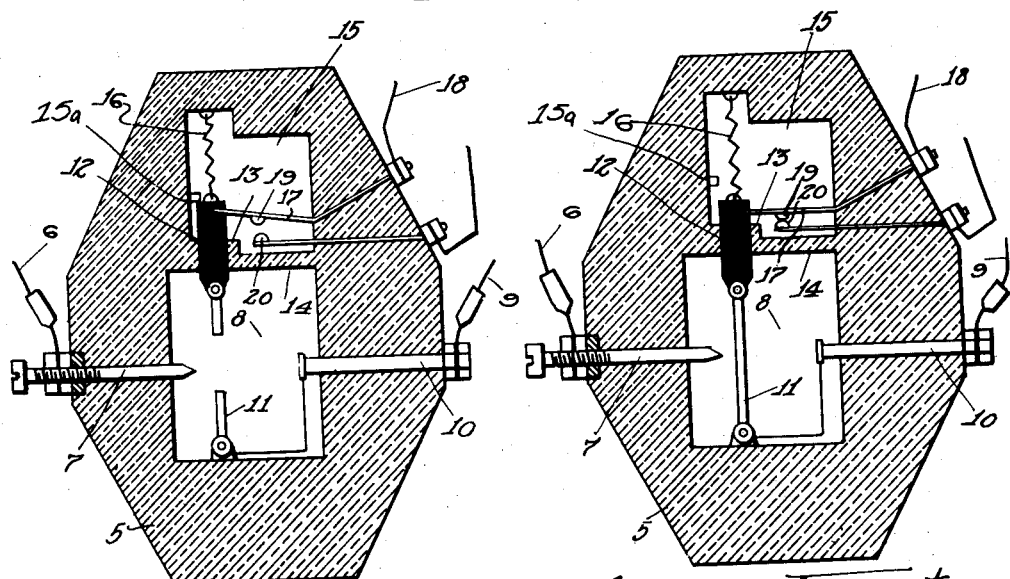
Fig. 2 is a sectional view of the device in its normal operating condition.
Fig. 3 is a view similar to Fig. 2 illustrating the device after it has automatically functioned.

Referring now to Fig. 2, the protective device is incorporated in a body 5 of a suitable insulating material, such as porcelain, so designed as to be waterproof and to prevent leakage of the high tension secondary voltage to the primary circuit, or to ground. A lead 6 is brought from one side of the high tension circuit and is connected to an electrode 7, carried by the insulating body 5 and extending therethrough into a chamber 8 provided in the body 5. The electrode 7 is adjustable lengthwise within the body 5, so that the amount which the electrode 7 projects into chamber 8 can be varied, for a purpose which will hereinafter appear.

A second lead 9 extends from the opposite side of the high tension secondary circuit to an electrode 10 also extending into the insulating body 5 and terminating in the chamber 8 below the adjustable electrode 7. The electrode 10 is connected to the lower end of a link 11, preferably composed of conducting metal having a relatively low melting point, the lower end of link 11 being anchored to the insulating body 5 at its point of connection to the electrode 10. The upper end of the link 11 is secured to a block 12 of insulating material, the block 12 being movable between guides 13 provided by the body 5. The guides 13 are preferably supported by a wall, or partition 14, of insulating material which separates the chamber 8, within which are located the high tension electrodes 7 and 10, from a second chamber 15, in which are located portions of the low tension primary circuit. The block 12 extends into the chamber 15 and the upper end thereof is connected to one end of a spring 16 having its upper end anchored within the insulating body 5. The pull of the spring 16 is sufficient to place the link 11 under tension, so that the block 12 is always under a force tending to move it into the low tension chamber 15, which force is opposed so long as the link 11 remains whole.

The portion of the block 12 which extends into the chamber 15 is secured to one end of a flexible contact arm 17, the other end of which is anchored in the insulating body 5 and is permanently connected to a lead 18 from one side of the low tension switch 2. The flexible arm 17 carries a contact member 19 which, in the position of the parts shown in Fig. 2, is in engagement with a stationary contact 20 carried by the insulating body 5 and permanently connected to one terminal of the primary winding 1.

Therefore, with the block 12 in the position shown in Fig. 2, that is with the link 11 solid, the circuit of the primary winding 1 is maintained through the closed contacts 19 and 20 and it is obvious that any separation of these contacts 19 and 20 will cause the primary winding 1 to be deenergized. Under all normal conditions of operation of the transformer, the circuit of the high tension secondary winding remains closed through the load 4 and the protective device remains as shown in Fig. 1. However, if for any reason whatsoever the circuit of the high tension secondary winding 3 should be broken, then a high voltage discharge will take place within the chamber 8 between the end of the electrode 7 and the link 11, and the heat generated by this discharge will cause the link to melt and break. Whenever this occurs, the pull of the spring 16 immediately draws the insulating block 12 upwardly into the chamber 15 against a suitable stop 15a, thereby flexing the arm 17 upwardly and disengaging the contacts 19 and 20. This has the immediate effect of breaking the circuit of the low tension winding 1, thus deenergizing the entire transformer and rendering all portions of the high tension secondary circuit dead.

In order to restore the device to its normal operating condition so that the secondary may again be energized, it is necessary to replace the broken link 11, prior to which operation it may be assumed that the person making the replacement of the link 11 will first open the switch 2 connecting the primary winding 1 to the source. As previously pointed out, the high tension electrode 7 is adjustable in the insulating body 5, so that the gap between the electrode 7 and the link 11 can be set for the voltage of the high tension circuit. In other words, the higher the secondary voltage the greater will be the length of the gap between the electrode 7 and the link 11, so that the discharge at this point will take place only when a break occurs in the normally closed secondary circuit.

From the foregoing then, it is apparent that by my invention I have provided a device that is adapted to automatically open the primary circuit of a high tension transformer immediately upon the occurrence of a break in the high tension secondary circuit, thereby rendering the entire circuit dead and incapable of causing injury until the trouble has been remedied and the fusible link within the device replaced.

Figure 4:
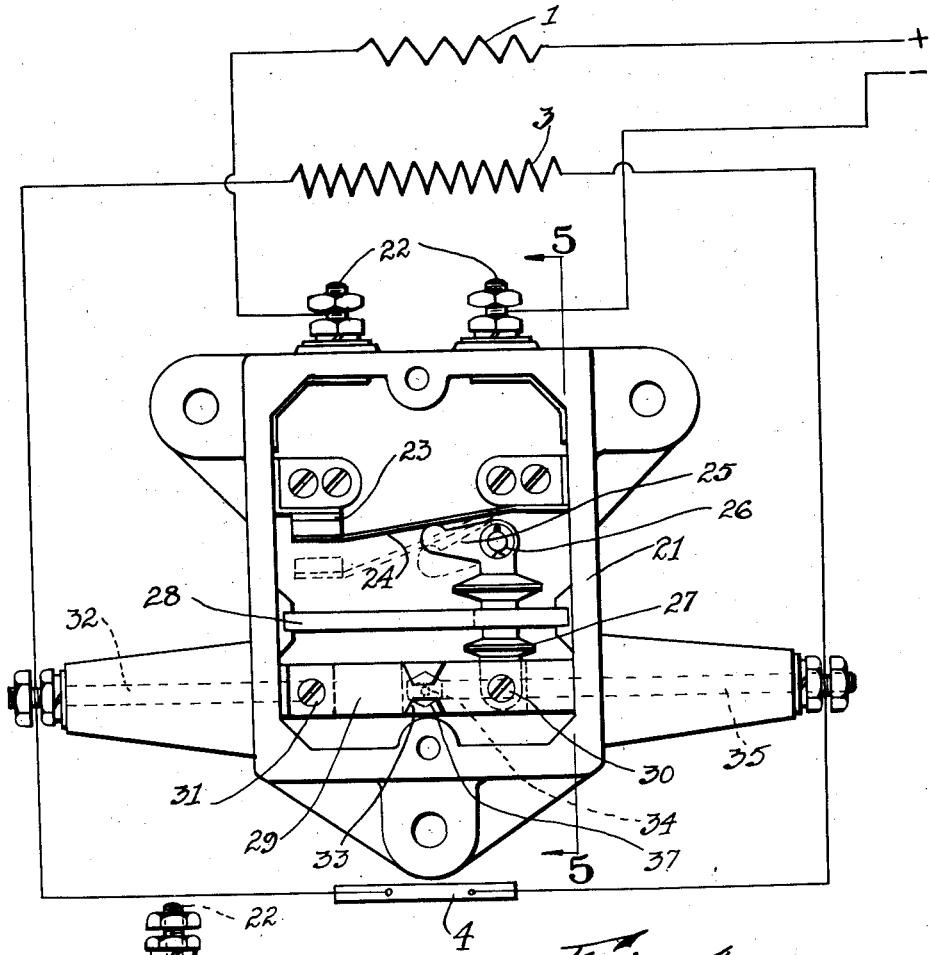
Fig. 4 is a view in front elevation showing a modification of my device.

Referring now to Fig. 4, the modified device consists of a casing 21 of insulating material providing terminals 22 which are connected in the circuit of the primary winding 1 of the transformer. One terminal 22 is connected to a stationary contact 23 while the other terminal is connected to a resilient contact 24. The contact 24 is normally held in engagement with the stationary contact 23 by one arm 25 of a bell crank lever mounted on a pivot pin 26. The other arm 27 of the lever extends downwardly through an insulating partition 28 in the casing 21 and has its lower end secured to a fusible link 29 by pin 30. The link 29 is anchored at its other end by a pin 31 to an electrode 32 extending into the casing 21, the outer end of which electrode 32 is connected to one side of the high voltage secondary winding 3 of the transformer.

Figure 5:
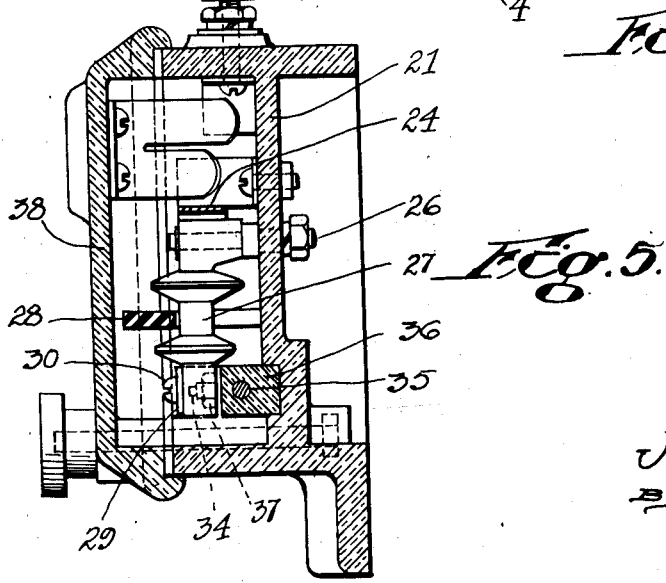
Fig. 5 is a sectional view along the line 5—5 of Fig. 4.

The fusible link 29 provides a reduced portion 33 and as shown in Fig. 5 a discharge electrode 34 terminates a short distance from the reduced portion 33 of the fusible link 29. The discharge electrode 34 is carried by a conductor 35 extending through an insulating block 36 and projecting outside the casing 21 where it is connected to the other side of the high tension winding 3 of the transformer. The electrode 34 is adjustable within the block 36 so that the distance between the end of this electrode 34 and the link 29 may readily be varied, a nut 37 serving to lock the electrode 34 in position.

As previously pointed out the contact 24 is resilient and is so formed that when unopposed it will separate itself from the stationary contact 23. However when the lower end of the lever arm 27 is connected to the free end of the fusible link 29 the upper arm 25 bears against the resilient contact 24 and positively holds it in engagement with the stationary contact 23 thereby maintaining the circuit of the primary winding 1. Obviously the contacts 23 and 24 will remain in engagement so long as the fusible link 29 holds the lever arm 27 in the position shown in Fig. 4.

The load is indicated at 4 and so long as high tension current is supplied to the load 4 by the winding 3 the circuit of the primary winding 1 remains closed. If, however, for any reason a break occurs in the secondary high tension circuit a high voltage discharge immediately takes place between the electrode 34 and the reduced portion 33 of the fusible link 29 so that the link 29 fuses very quickly and breaks. When this occurs the lower end of the lever arm 27 is released thereby permitting the inherent resiliency of the contact 24 to cause the contact to straighten out and thereby separate itself from the stationary contact 23 as shown in dotted lines in Fig. 4. This breaks the circuit of the primary winding 1 thereby deenergizing the high tension circuit until the circuit of the primary winding is restored by renewing the broken link 29. The casing 21 is provided with a glass cover 38, shown removed in Fig. 4, so that the condition of the device may be readily observed at any time.

I claim:

1. A high voltage protective device for use in connection with electrical transformers comprising a casing of insulating material providing separate chambers therein, a pair of normally closed low voltage contacts in one of said chambers, one of which contacts is separable from the other, a pair of high voltage terminals extending into the other chamber and a fusible link electrically connected to one of said high voltage terminals and mechanically connected to the movable contact in the other chamber, said link being spaced from the other high voltage terminal, whereby a discharge between the high voltage terminal and said link results in the fusing of said link and the separation of the contacts in the low voltage chamber.

2. A high voltage protective device for use in connection with electrical transformers comprising a casing of insulating material providing separated chambers, a pair of normally closed low voltage contacts in one of said chambers, one of which is resilient and tends to separate from the other contact, a pair of high voltage terminals extending into the other chamber and a fusible link connected electrically to one of said high voltage terminals and connected mechanically to the resilient contact in the other chamber whereby to hold said low voltage contacts in normal engagement, said link being spaced from the other high voltage terminal within the high voltage chamber, whereby a high voltage discharge between said terminal and said link results in the fusing of said link and the separation of the resilient contact from the other low voltage contact.

3. A high voltage protective device for use in connection with electrical transformers comprising a casing of insulating material providing separated chambers, a pair of normally closed low voltage contacts in one of said chambers one of which is resilient and tends to separate from the other contact, a lever pivotally mounted adjacent to said contacts, a pair of high voltage terminals extending into the other chamber and a fusible link connected electrically to one of said high voltage terminals at one end, with its other end connected to said lever to hold said lever in such a position as to maintain said contacts in engagement, said link being spaced from the other high voltage terminal within the high voltage chamber.

4. A high voltage protective device for use in connection with electrical transformers comprising a casing of insulating material providing separated chambers, a pair of normally closed low voltage contacts in one of said chambers one of which is resilient and tends to separate from the other contact, a bell crank lever pivotally mounted with its arms extending into both chambers, a pair of high voltage terminals extending into the high voltage chamber and a fusible link connected at one end to one of said high voltage terminals and connected at its other end to one arm of said lever to cause its other arm to maintain said contacts in engagement while said link remains unbroken.

JOHN J. BIEGER.